US011304172B2

(12) United States Patent
Kiefer et al.

(10) Patent No.: US 11,304,172 B2
(45) Date of Patent: Apr. 12, 2022

(54) SITE ESTIMATION BASED ON CROWD SOURCED DATA

(71) Applicant: AT&T Intellectual Property I, L.P., Atlanta, GA (US)

(72) Inventors: Ronald Kiefer, Louisville, KY (US); Mario Kosseifi, Roswell, GA (US); Xiaodi Zhang, San Ramon, CA (US); Kumar Vadlamudi, Frisco, TX (US); Badal Chowdhary, Union, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 16/867,868

(22) Filed: May 6, 2020

(65) Prior Publication Data

US 2021/0352609 A1 Nov. 11, 2021

(51) Int. Cl.
| | |
|---|---|
| *H04W 4/00* | (2018.01) |
| *H04W 64/00* | (2009.01) |
| *H04W 4/029* | (2018.01) |
| *G06N 20/00* | (2019.01) |
| *H04W 48/20* | (2009.01) |
| *H04W 4/02* | (2018.01) |

(52) U.S. Cl.
CPC .......... *H04W 64/003* (2013.01); *G06N 20/00* (2019.01); *H04W 4/023* (2013.01); *H04W 4/029* (2018.02); *H04W 48/20* (2013.01)

(58) Field of Classification Search
CPC ....... H04W 4/029; H04W 64/00; H04W 4/02; H04W 4/021; H04W 64/003; G06N 20/00; G06N 3/08
See application file for complete search history.

(56) References Cited

U.S. PATENT DOCUMENTS

| | | | |
|---|---|---|---|
| 2014/0274113 A1* | 9/2014 | Teed-Gillen | G01S 5/0027 455/456.1 |
| 2017/0195832 A1* | 7/2017 | Santiago | H04B 17/27 |
| 2017/0280413 A1* | 9/2017 | Zhang | G01S 5/021 |
| 2018/0225569 A1* | 8/2018 | Tommy | G06F 30/20 |
| 2018/0338245 A1* | 11/2018 | Tam | H04W 16/14 |

* cited by examiner

*Primary Examiner* — Omoniyi Obayanju
(74) *Attorney, Agent, or Firm* — Guntin & Gust, PLC; John Rauch

(57) ABSTRACT

Crowd sourced data from mobile devices may be used to estimate site locations. In addition, machine learning models may be used to filter out any inaccurate crowd sourced data before using algorithms to estimate the cell site location. An apparatus may include a processor and a memory coupled with the processor that effectuates operations. The operations may include receiving data associated with a location of plurality of devices that have connected with a base station in a geographic area; determining a machine learning model to apply to the received data based on the type of data, wherein the machine learning model is a clustering model; performing the clustering model on the received data; based on the performing the clustering model on the received data, obtaining representative data that excludes outliers in the received data; based on the representative data, determining a location of the base station in the geographic area; and sending a message with the location of the base station.

20 Claims, 6 Drawing Sheets

SITE ESTIMATION BASED ON CROWD SOURCED DATA

BACKGROUND

Mobile devices such as cellular telephones, PDAs, etc. are proliferating like never before. Users may install applications to access several different provider networks and can access voice, text, and multimedia data from other network entities such as servers and other mobile devices.

These mobile devices additionally include Global Positioning System (GPS) receivers, which provides for a host of location-based services (LBS). Location estimation of mobile devices is important for obtaining location tagged network failure data for system optimization, location-based services, 911 services, and a variety of other location enhanced applications.

This background information is provided to reveal information believed by the applicant to be of possible relevance. No admission is necessarily intended, nor should be construed, that any of the preceding information constitutes prior art.

SUMMARY

Crowd sourced data from mobile devices may be used to estimate site locations. In addition, machine learning models may be used to filter out any inaccurate crowd sourced data before using algorithms to estimate the cell site location.

In an example, an apparatus may include a processor and a memory coupled with the processor that effectuates operations. The operations may include receiving data associated with a location of plurality of devices that have connected with a base station in a geographic area; determining a machine learning model to apply to the received data based on the type of data, wherein the machine learning model is a clustering model; performing the clustering model on the received data; based on the performing the clustering model on the received data, obtaining representative data that excludes outliers in the received data; based on the representative data, determining a location of the base station in the geographic area; and sending a message with the location of the base station.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

By estimating where other network operators have built cell sites and where they are adding new sites, an operator can discover its advantages or disadvantages compared with its competitors. This can help with new design plans to enhance areas that other carriers are now covering better and improve network coverage and expand new generation technologies. As a competitor brings new sites online, it may be helpful to understand what advantages this provides. This can help with new network design and investing plans to enhance the network performance for better user experience.

Conventional drive testing to determine base station (e.g., cell site) locations may only use the data available where drives were conducted, which may leave a considerable amount of the network untested. Additionally, it is only practical to collect data via drive testing or the like a few times a year so this data may become out of date rather quickly during major deployments. However, crowd sourced data may be collected continuously in near real-time and may be used to determine base station locations.

Even though using crowd sourced data may generally lead to more real-time testing, the crowd sourced data may include inaccurate information, such as incorrect cell identity, incorrect latitude/longitude (lat/lon) location information, or inaccurate timing advance (TA) measurements. Using such inaccurate information may lead to cell site location estimation errors that would be too inaccurate to use. Therefore, as disclosed herein, machine learning models may be used to filter out the inaccurate information before using algorithms to estimate the cell site location.

Figure 1:
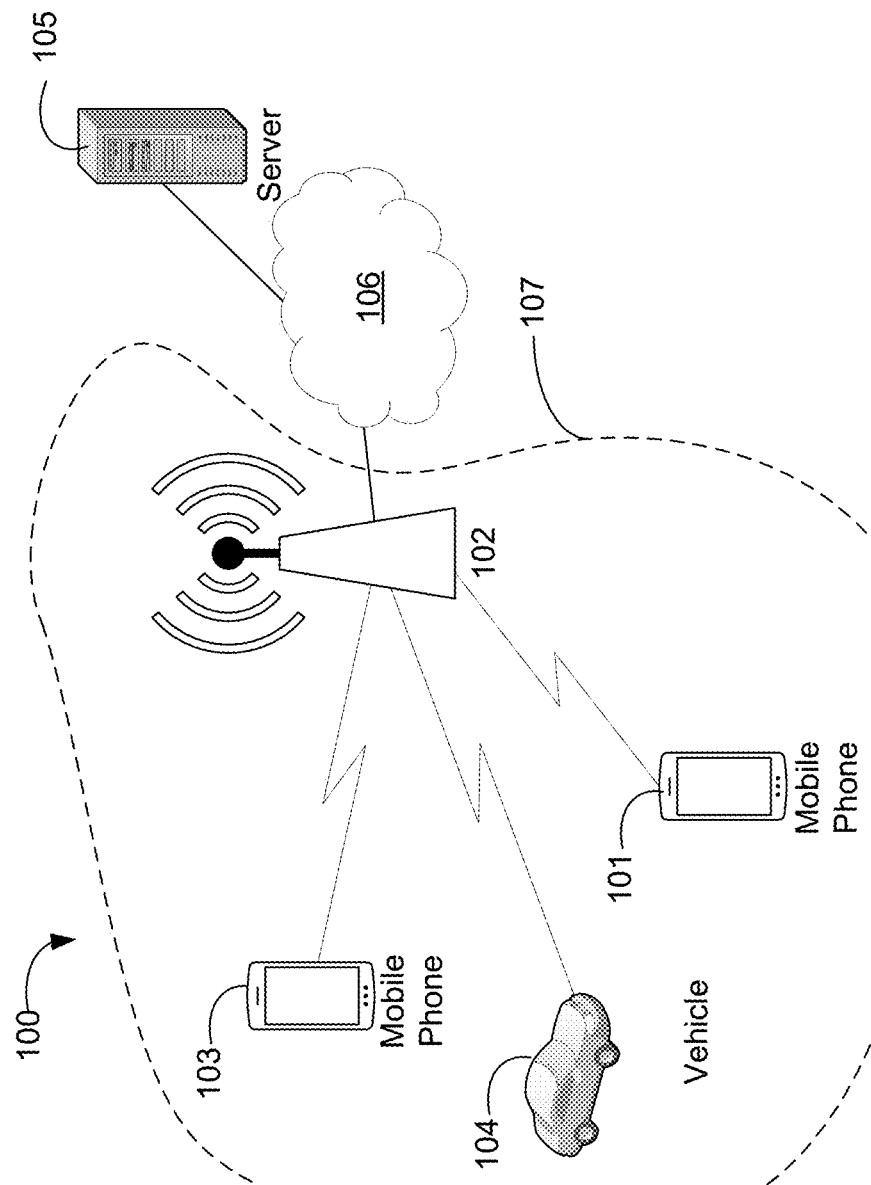
FIG. 1 illustrates an exemplary system for site estimation based on crowd sourced data.

FIG. 1 illustrates an exemplary system for site estimation based on crowd sourced data, among other things. System 100 may include network 106, user equipment (UE) 101, base station 102, UE 103, or UE 104. The devices of system 100 may be communicatively connected with each other and network 106 (e.g., a cloud network). The UEs may include a laptop, tablet, autonomous vehicle (e.g., SAE Intl level 3 to level 5 automation), mobile phone, or internet of things device, among other devices. Vehicles may include aerial, ground, or water-based vehicles. Server 105 may obtain location related data from the plurality of devices of system 100 and use machine learning or other algorithms to assist in accurately determining the location of base station 102.

Figure 2:
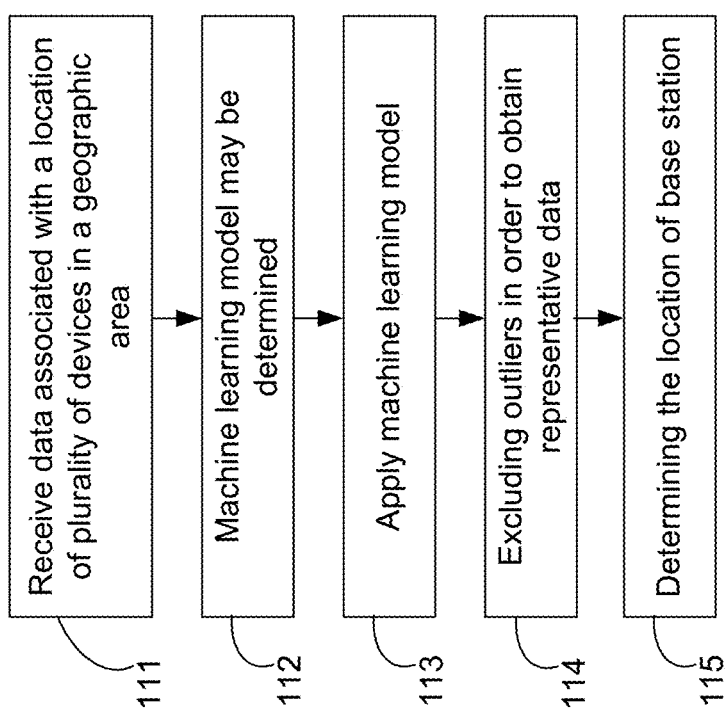
FIG. 2 illustrates an exemplary method for site estimation based on crowd sourced data.

FIG. 2 illustrates an exemplary method for site estimation based on crowd sourced data, among other things. At step 111, server 105 may receive data associated with a location of plurality of devices of system 100 in a geographic area. The location data may be gathered from the plurality of UE of system 100 via an installed application. For example, UE 101 may have an app that is installed to enable the use of a service. The user of UE 101 may authorize the use of data collected during the use of the service (e.g., a speed test service or drive test benchmarking tool service). This gathered application data may include the latitude for UE 101, the longitude for UE 101, the distance between UE 101 and base station 102 (e.g., eNodeB cell site), or the timing advance, along with other data. The distance between UE 101 and base station 102 may be calculated based on the timing advance.

With continued reference to FIG. 2, at step 112, a machine learning model may be determined by server 105. The machine learning model may be based on the type of data received. The type of data may include RF information, device type information, or distance information, among other things. In this example scenario, the machine learning model may be a clustering model, such as density-based spatial clustering of applications with noise (DBSCAN). DBSCAN is a density-based clustering non-parametric algorithm: given a set of points in some space, it groups together points that are closely packed together (e.g., points with many nearby neighbors), marking as outliers points that lie alone in low-density regions (whose nearest neighbors are too far away).

With continued reference to FIG. 2, at step 113, server 105 may apply the clustering model, to the data of step 111. At step 114, based on the applying of the clustering model, excluding outliers in order to obtain a cluster of data (herein referred to as representative data) that may be subsequently used for determining a location of base station 102. As shown in Table 1, clustering labels may be associated with each UE of system 100 within a geographic area. Table 1 lists some sample data from one cell site collected by using crowd sourcing (e.g., data gathered from one or more applications). This table of crowd sourced data of each device of the plurality of devices of system 100 may include the locations (e.g., UE_LAT/UE_LON), the estimated distance between each device and base station 102, or the timing advances (TA). The "clustering labels" may be considered the output of the clustering machine learning model, which is not in the crowd sourced data.

Figure 3A:
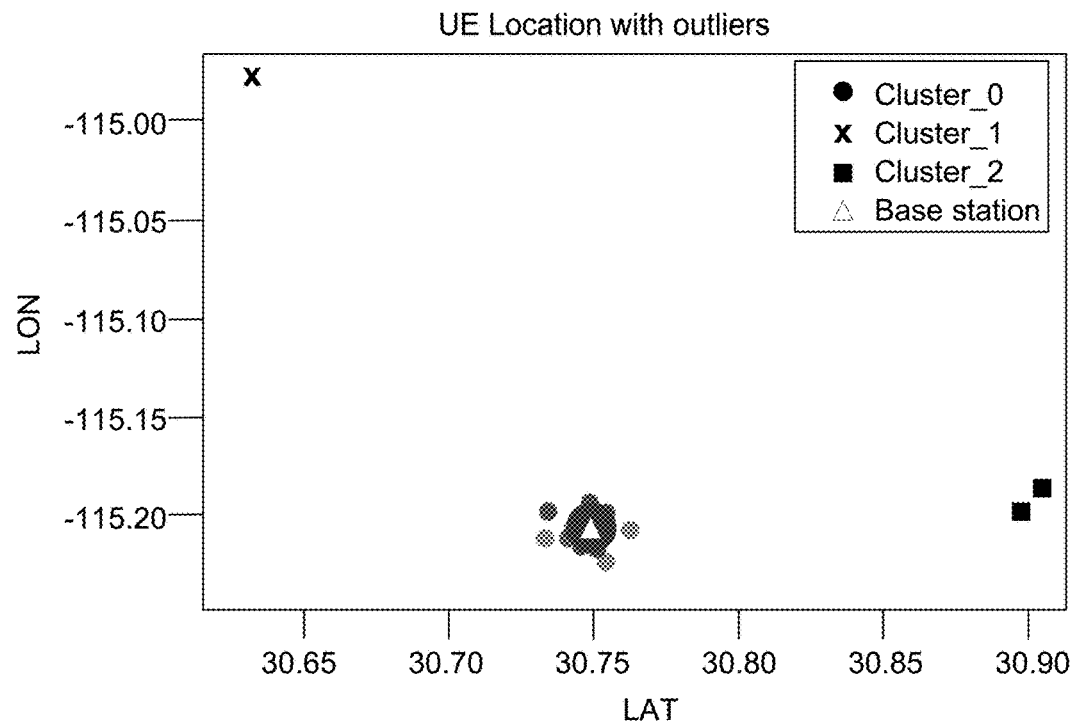
FIG. 3A illustrates exemplary map view for user equipment (UE) locations.
Figure 3B:
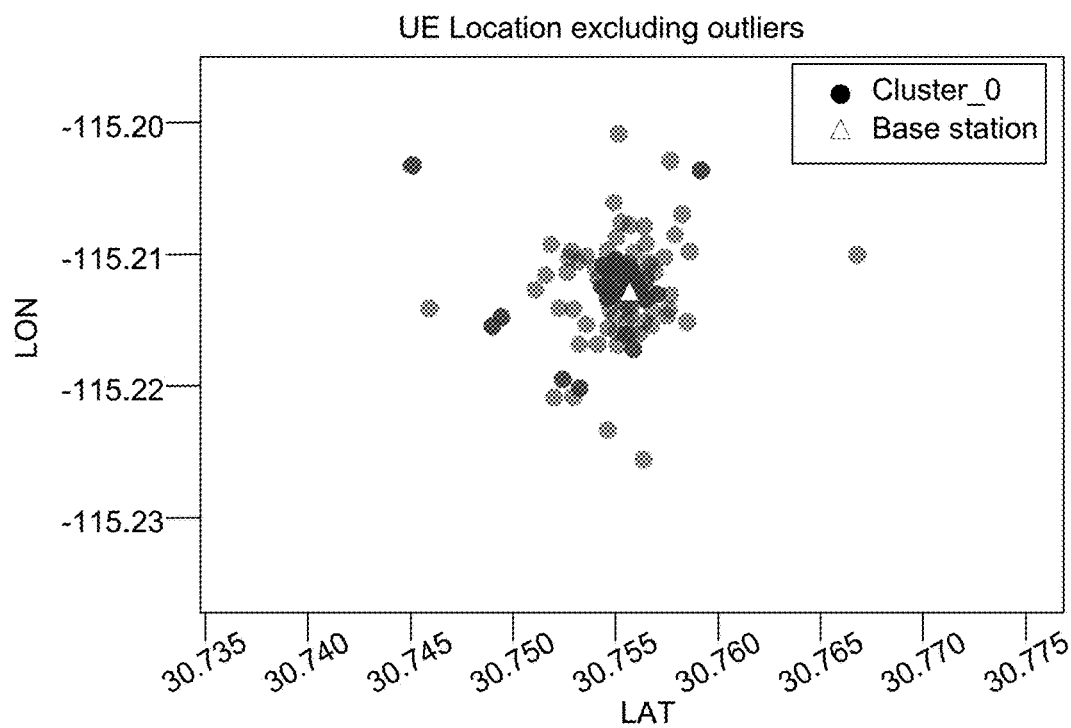
FIG. 3B illustrates exemplary map view for UE locations.

With continued reference to step 114 and Table 1, FIG. 3A and FIG. 3B illustrate exemplary map view for user equipment (UE) locations associated within geographic area 107. Applying the clustering model to UE_LAT/UE_LON, these UE locations are clustered into 3 clusters shown in "Clustering label" of Table 1. FIG. 3A shows the map view of the UEs within a geographic area (e.g., geographic area 107). It is seen that most of the UEs are clustered as cluster_0 except several UE locations are far away from the majority labeled as cluster_1 and cluster_2 respectively. If the data points with cluster_1 and cluster_2 are used to calculate the cell site location, the wrong cell site location would be around lat/lon (30.89597, −115.21337), which is 15657 meters far away from the actual cell site location (30.75554, −115.21337). Hence, these outliers should be excluded. The data points in the cluster having the most data points to perform the trilateration algorithm should be selected as the representative data to estimate the cell site location (e.g., location of base station 102). FIG. 3B shows cluster_0, which should be selected in subsequent location determinations of base station 102. Note that other outlier detection models and information in the crowd source such as radio frequency reference signal received power (RF RSRP), reference signal received quality (RSRQ), downlink throughput, uplink throughput, or latency can also apply to remove the inaccurate data points. For example, if RF information is clustered in three clusters, then the cluster with the most data points will be used and the others excluded. Further, RF information can also be combined with UE locations to perform the clustering. The cluster with the fewest data points may be excluded since they may be the outliers or they are not representative data points from the RF perspective view.

TABLE 1

| Anonymized Device ID | UE_LAT | UE_LON | DISTANCE (m) | TA | Clustering label |
|---|---|---|---|---|---|
| A | 30.75435 | −115.20506 | 312.500 | 4.0 | 0 |
| B | 30.75234 | −115.21069 | 156.250 | 2.0 | 0 |
| C | 30.75118 | −115.21268 | 546.875 | 7.0 | 0 |
| D (e.g., UE 101) | 30.75495 | −115.21242 | 78.125 | 1.0 | 0 |
| . . . | . . . | . . . | . . . | . . . | . . . |
| E (e.g., UE 104) | 30.62975 | −114.97969 | 156.25 | 2.0 | 1 |
| F | 30.89585 | −115.20237 | 0.00 | 0.0 | 2 |
| G (e.g., UE 103) | 30.89902 | −115.19189 | 0.00 | 0.0 | 2 |

Figure 4:
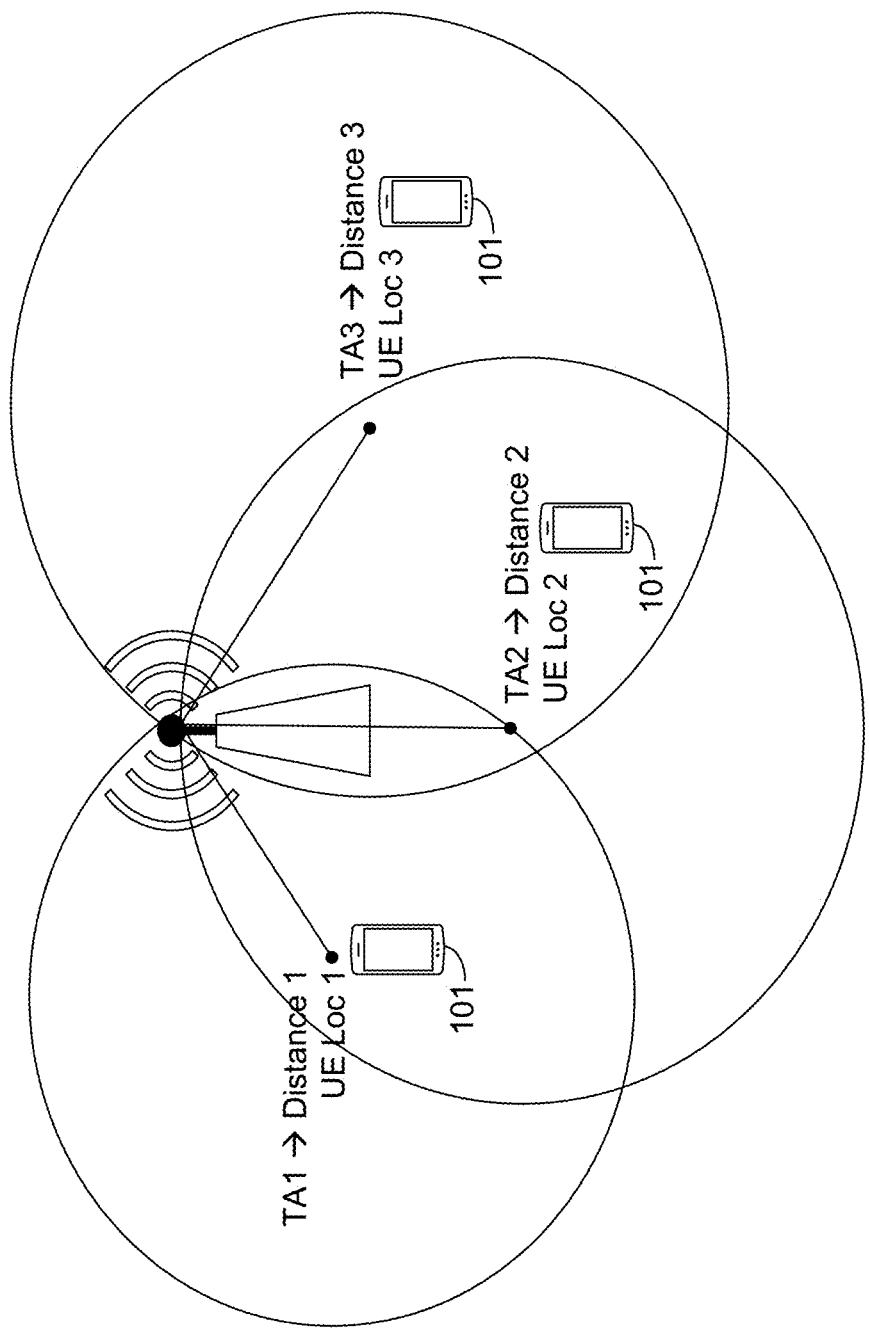
FIG. 4 illustrates an exemplary system using trilateration.

At step 115, based on the representative data, determining the location of base station 102. An example method for determining the location of base station 102 is trilateration. In a scenario in which trilateration is used, based on the representative data, the location of the site can be estimated by applying the trilateration algorithm to the three different UE locations associated with the same cell site to calculate the intersection of the three circles with the radius based on the TA. FIG. 4 illustrates an exemplary system using trilateration. At step 116, the determined location of base station 102 may be sent for further processing. For example, the determined base station 102 locations may be used in a map which displays cell sites for base stations of one or more service providers.

Additional perspective is provided below with regard to site estimation and crowd sourced date. Disclosed herein is the use of a machine learning model, such as a clustering model, to cluster the data associated with the same geographic area (e.g., cell site) into different groups based on the lat/lon location, TA measurement, and RF info. The groups containing most of the data points may be selected and further processed to do the base station location determination algorithm to get multiple intersection points. The median of these intersection points may be determined to be the estimated the cell site location. Alternatively, or in addition to, the machine learning model may use multiple other filtering methods to rule out inaccurate results. In a first example, the ratio of TA and signal measurement from the UEs may be collected and used in the machine learning model. In a second example, location of the estimated site from existing poles, towers, or buildings or the use of some satellite imaging recognition algorithms may be collected and used in the machine learning model. For this second example, different information may combined to use in machine learning models or otherwise use in or with base station location determination algorithms to determine the location of the cell site.

With near real-time estimates of site locations and quantities, operators can better estimate their competitors' build-out plans and make more informed strategic decisions. The data collected from the UE may include many events and counters that can be used for the location calculation. Again, Lat/long (coordinates), TA (Timing Advance), Site ID, RF measurements, quality measurements, frequency, and technology used may be collected. The disclosed subject matter may allow for estimation accuracy of the distance from the true site location and the estimated location to be within 50 to 100 meters or less. The technology (e.g., type of UE) and the frequency may allow for understanding the type of propagation that exists, in order to narrow and filter out outliers. It is contemplated that the disclosed steps may occur on one device or distributed over multiple devices.

Figure 5:
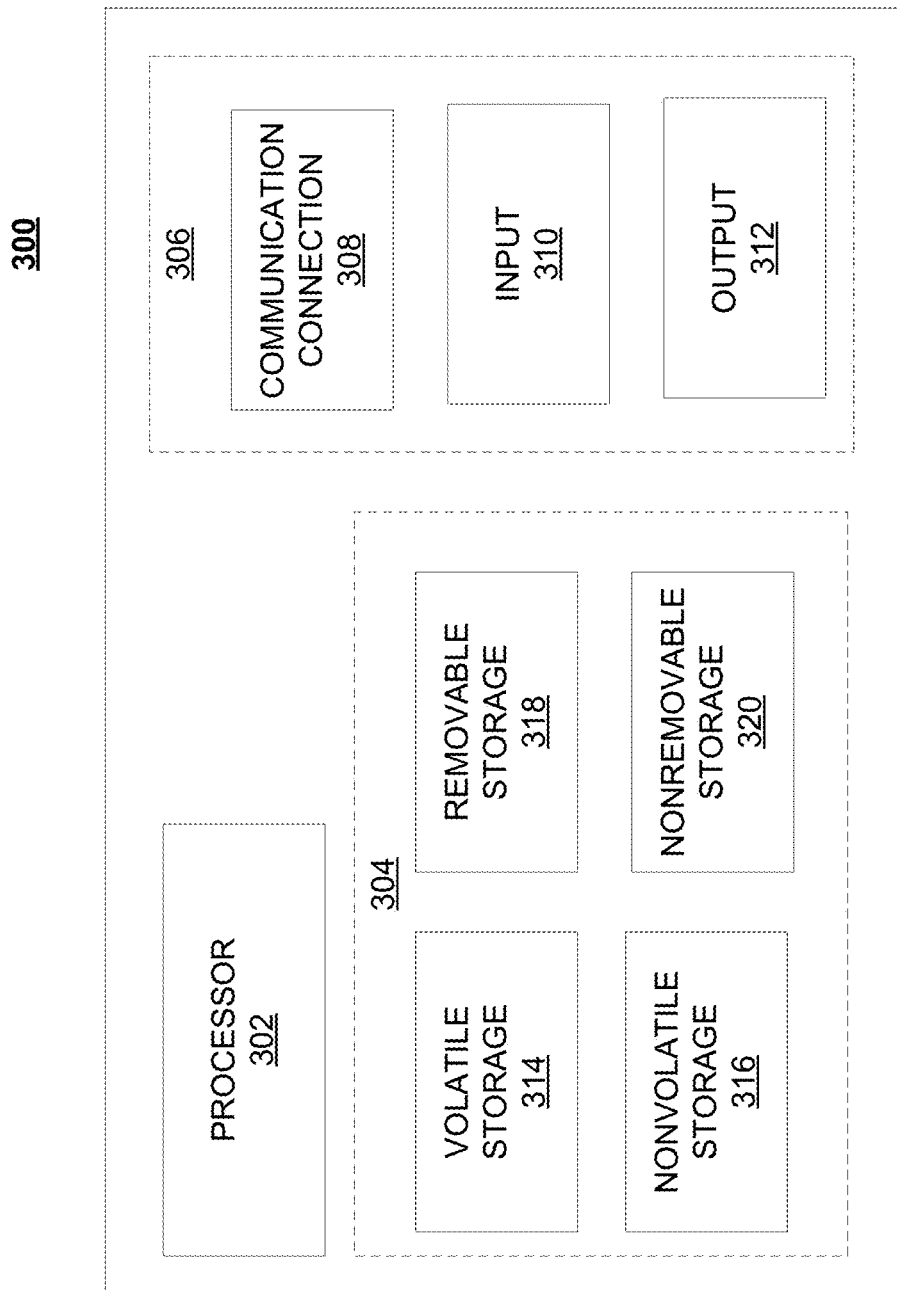
FIG. 5 illustrates a schematic of an exemplary network device.

FIG. 5 is a block diagram of network device 300 that may be connected to or comprise a component of the systems disclosed herein, such as FIG. 1-FIG. 4. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
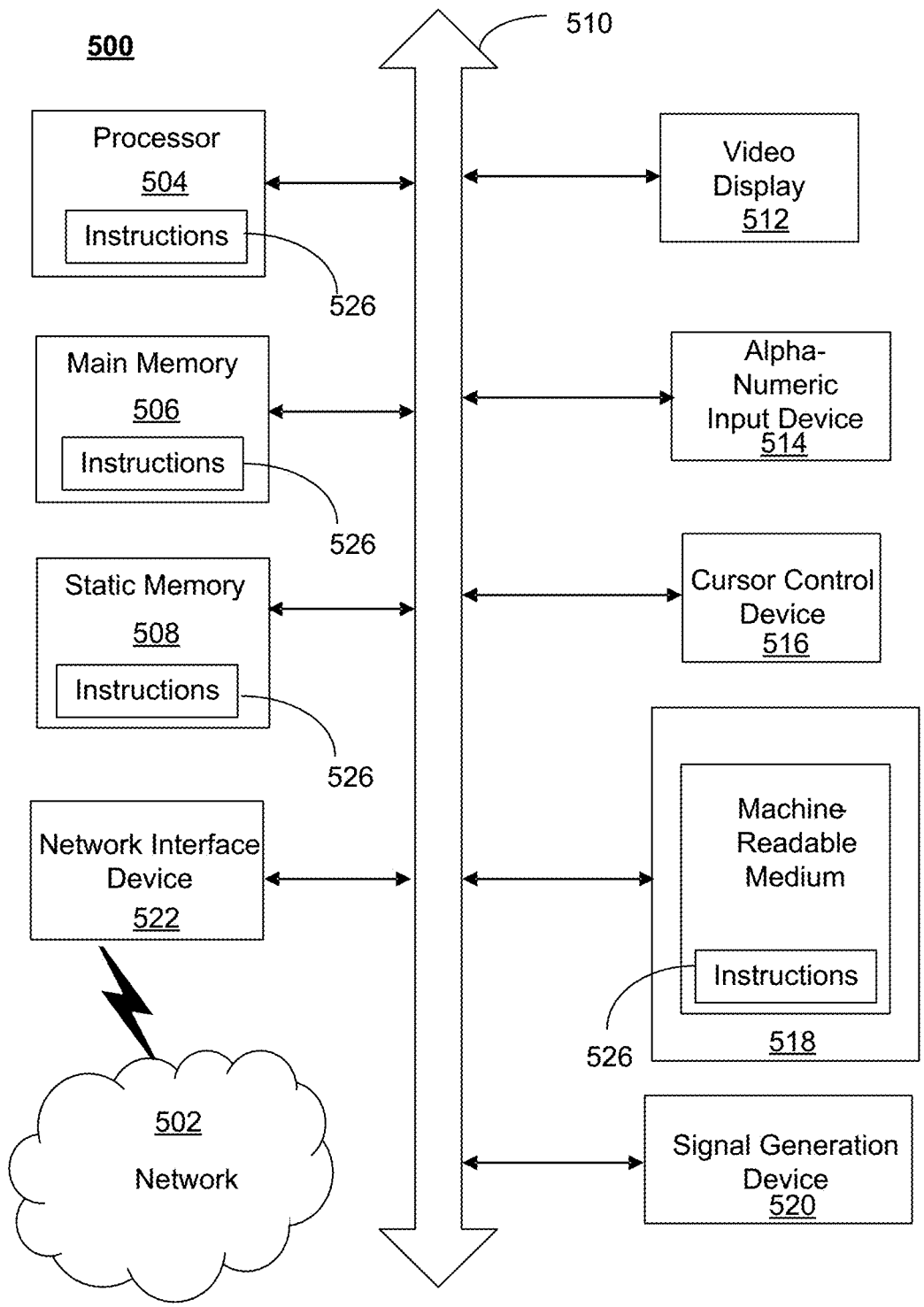
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 101, UE 103, UE 104, base station 102, server 105, and other devices of FIG. 1, FIG. 4, and FIG. 5. In some examples, the machine may be connected (e.g., using a network 502) to other machines. In a network deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a system in which site estimation and crowd sourced data can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—site estimation and crowd sourced data—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for means for site estimation using crowd sourced data. A method, system, computer readable storage medium, or apparatus receiving data associated with a location of plurality of devices that have connected with a base station in a geographic area; determining a machine learning model to apply to the received data based on the type of data, wherein the machine learning model is a clustering model; performing the clustering model on the received data; based on the performing the clustering model on the received data, obtaining representative data that excludes outliers in the received data; based on the representative data, determining a location of the base station in the geographic area; and sending a message with the location of the base station. The location may be determined by using trilateration. The location of the base station may be provided to a visual mapping application. The crowd sourced data may include anonymized data from applications of the plurality of devices. The crowd sourced data may include timing advance data, radio frequency data, DL or UL throughput data. The clustering model may include density-based spatial clustering of applications with noise (DBSCAN), K-Means Clustering, Mean-Shift Clustering, Expectation-Maximization (EM) Clustering using Gaussian Mixture Models (GMM), or Agglomerative Hierarchical Clustering. All combinations in this paragraph (including the removal or addition of steps) are contemplated in a manner that is consistent with the other portions of the detailed description.

What is claimed:

1. An apparatus comprising:
   a processor; and
   memory coupled with the processor, the memory storing executable instructions that when executed by the processor cause the processor to effectuate operations comprising:
   receiving crowd sourced data associated with a location of a plurality of devices that have connected with a base station in a geographic area, the crowd sourced data including at least some inaccurate information including one or more of incorrect cell identity information, or inaccurate time advance measurement information;
   determining a machine learning model to apply to the received crowd sourced data based on the type of data, wherein the machine learning model is a clustering model;
   performing the clustering model on the received crowd sourced data to filter out the at least some inaccurate information;
   filtering out additional inaccurate information based on radio frequency information including downlink throughput, uplink throughput and latency information for the plurality of devices that have connected with the base station,
   obtaining representative data that excludes the at least some inaccurate information from the received crowd sourced data;
   based on the representative data, determining a location of the base station in the geographic area; and
   sending a message with the location of the base station.

2. The apparatus of claim 1, wherein the location is determined by using trilateration calculation.

3. The apparatus of claim 1, wherein the location of the base station is provided to a visual mapping application.

4. The apparatus of claim 1, wherein the crowd sourced data comprises anonymized data from applications of the plurality of devices.

5. The apparatus of claim 1, wherein the crowd sourced data comprises timing advance data.

6. The apparatus of claim 1, wherein the crowd sourced data comprises radio frequency data.

7. The apparatus of claim 1, wherein the crowd sourced data comprises downlink throughput data or uplink throughput data.

8. The apparatus of claim 1, wherein the plurality of devices comprises user equipment.

9. The apparatus of claim 1, wherein the clustering model comprises density-based spatial clustering of applications with noise (DB SCAN), K-Means Clustering, Mean-Shift Clustering, Expectation-Maximization (EM) Clustering using Gaussian Mixture Models (GMM), or Agglomerative Hierarchical Clustering.

10. A non-transitory computer readable storage medium storing computer executable instructions that when executed by a computing device cause said computing device to effectuate operations comprising:
    receiving crowd sourced data associated with a location of a plurality of devices that have connected with a base station in a geographic area, the crowd sourced data including at least some inaccurate information including one or more of incorrect cell identity information, or inaccurate time advance measurement information;
    determining a machine learning model to apply to the received crowd sourced data, wherein the machine learning model is a clustering model;
    performing the clustering model on the received crowd sourced data to filter out the at least some inaccurate information;
    filtering out additional inaccurate information based on radio frequency information including downlink throughput, uplink throughput and latency information for the plurality of devices that have connected with the base station,
    obtaining representative data that excludes the at least some inaccurate information from the received crowd sourced data;
    based on the representative data, determining a location of the base station in the geographic area; and
    sending a message with the location of the base station.

11. The non-transitory computer readable storage medium of claim 10, wherein the location is determined by using trilateration.

12. The non-transitory computer readable storage medium of claim 10, wherein the location of the base station is provided to a visual mapping application.

13. The non-transitory computer readable storage medium of claim 10, wherein the crowd sourced data comprises anonymized data from applications of the plurality of devices.

14. The non-transitory computer readable storage medium of claim 10, wherein the crowd sourced data comprises timing advance data.

15. The non-transitory computer readable storage medium of claim 10, wherein the crowd sourced data comprises radio frequency data.

16. The non-transitory computer readable storage medium of claim 10, wherein the crowd sourced data comprises downlink throughput data or uplink throughput data.

17. The non-transitory computer readable storage medium of claim 10, wherein the plurality of devices comprises user equipment.

18. The non-transitory computer readable storage medium of claim 10, wherein the clustering model comprises K-Means Clustering, Mean-Shift Clustering, Expectation-Maximization (EM) Clustering using Gaussian Mixture Models (GMM), or Agglomerative Hierarchical Clustering.

19. A system comprising:
    one or more processors; and
    memory coupled with the one or more processors, the memory storing executable instructions that when executed by the one or more processors cause the one or more processors to effectuate operations comprising:

receiving crowd sourced data associated with a location of a plurality of devices that have connected with a base station in a geographic area, the crowd sourced data including inaccurate information including one or more of incorrect cell identity information, or inaccurate time advance measurement information;

determining a machine learning model to apply to the received crowd sourced data, wherein the machine learning model is a clustering model;

performing the clustering model on the received crowd sourced data to filter out the inaccurate information from the crowd sourced data;

filtering out additional inaccurate information based on radio frequency information including downlink throughput, uplink throughput and latency information for the plurality of devices that have connected with the base station, forming representative data that excludes the inaccurate information from the received crowd sourced data;

based on the representative data, determining a location of the base station in the geographic area; and sending a message with the location of the base station.

20. The system of claim 19, wherein the crowd sourced data comprises radio frequency data.

* * * * *